Aug. 18, 1970  S. A. PAOLI  3,524,487
MACHINE FOR CONTINUOUS PRODUCTION OF BONELESS COMMINUTED MEAT
Filed June 26, 1968  2 Sheets-Sheet 1
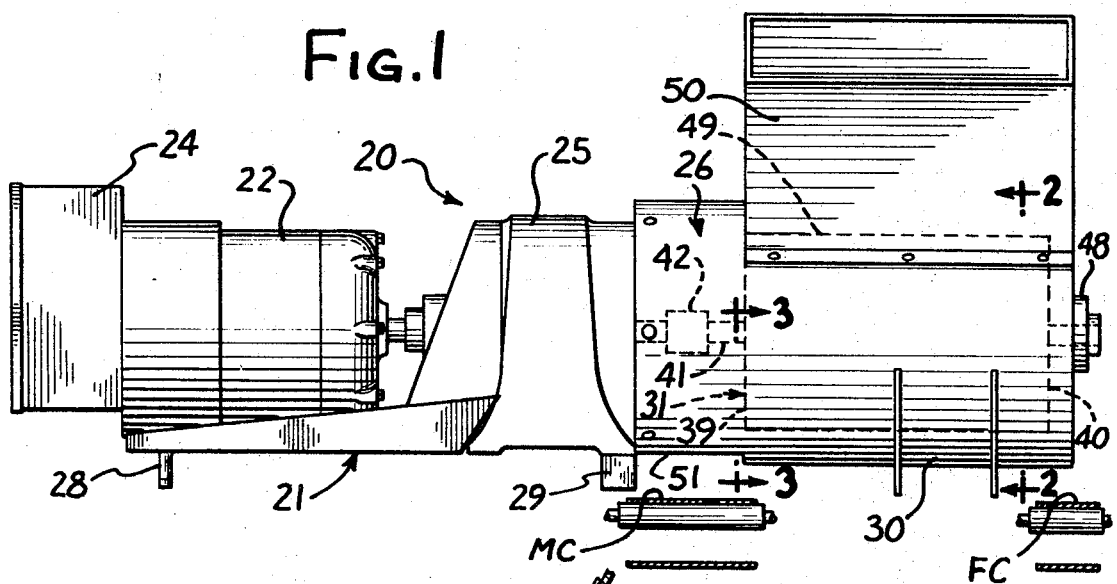
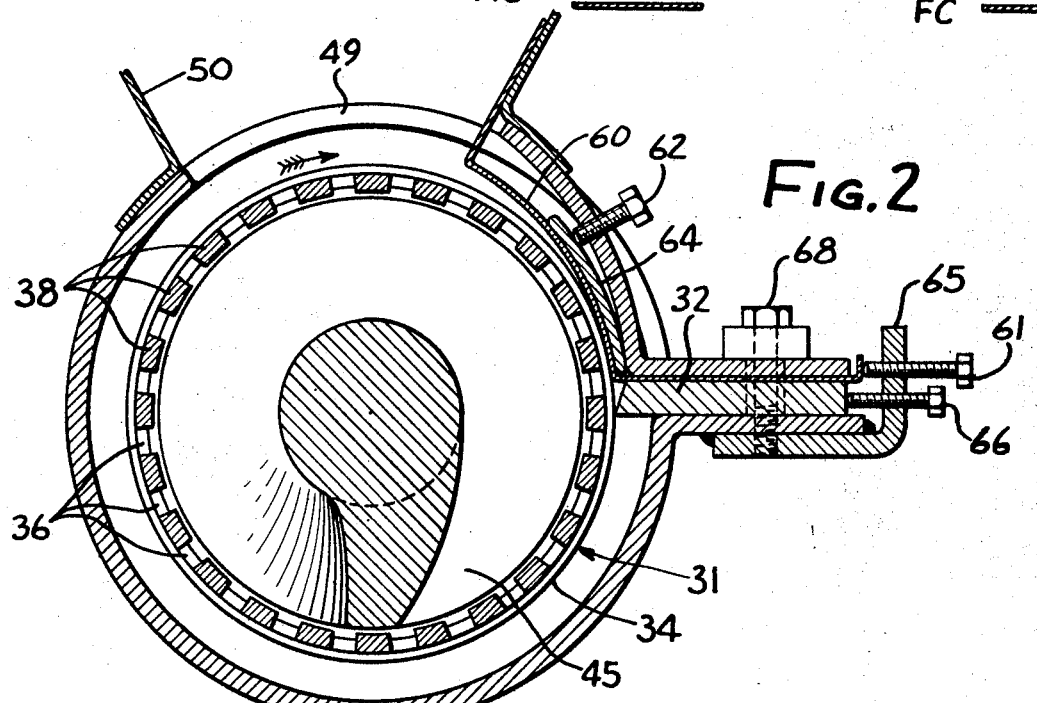
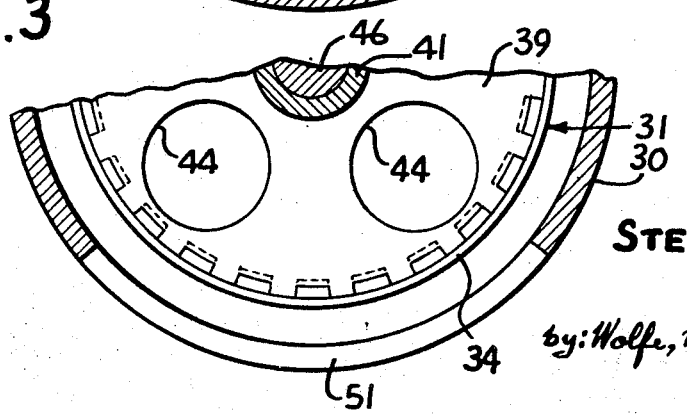
INVENTOR
STEPHEN A. PAOLI
by: Wolfe, Hubbard, Voit & Osann
ATTYS.

Aug. 18, 1970   S. A. PAOLI   3,524,487
MACHINE FOR CONTINUOUS PRODUCTION OF BONELESS COMMINUTED MEAT
Filed June 26, 1968   2 Sheets-Sheet 2
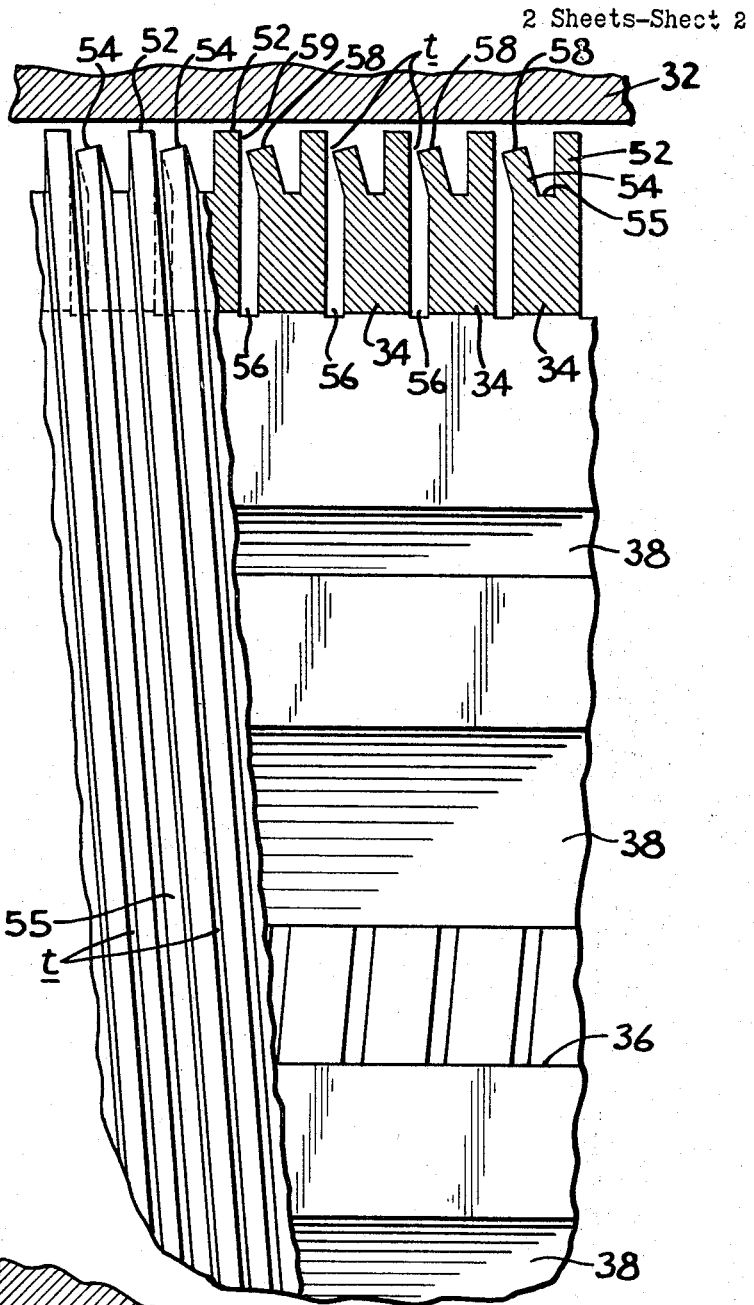
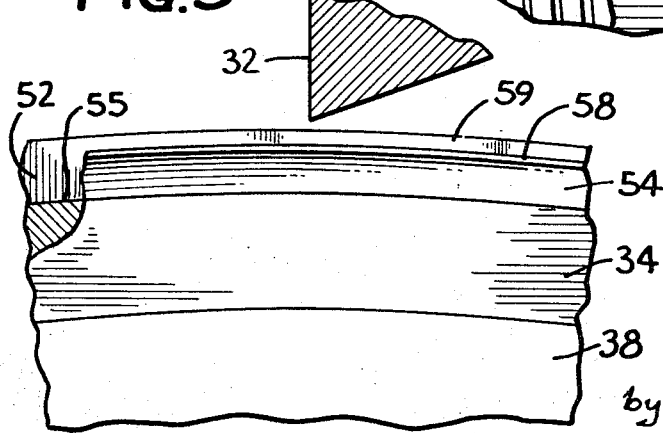
INVENTOR
STEPHEN A. PAOLI
by: Wolfe, Hubbard, Voit & Osann
ATTYS.

United States Patent Office 3,524,487
Patented Aug. 18, 1970

3,524,487
MACHINE FOR CONTINUOUS PRODUCTION
OF BONELESS COMMINUTED MEAT
Stephen A. Paoli, 520 6th St., Rockford, Ill. 61108
Filed June 26, 1968, Ser. No. 740,132
Int. Cl. A22c 17/00, 25/16; B02c 18/00
U.S. Cl. 146—76                                6 Claims

ABSTRACT OF THE DISCLOSURE

An improved machine for the continuous production of boneless comminuted meat from a dressed animal carcass or any portion thereof which has been reduced to a coarse agglomeration of meat and fragments of hard tissue material such as bone, gristle or the like, the machine automatically separating the meat from the fragments and discharging each separately.

DESCRIPTION OF THE INVENTION

The present invention relates to food processing machinery and, more particularly, to a machine for producing boneless comminuted meat from a dressed animal carcass or any portion thereof which has been reduced to a coarse agglomeration of meat and fragments of hard tissue material such as bone, gristle or the like. The invention represents an improvement over the machine disclosed and claimed in my prior U.S. Pat. No. 3,266,-542, issued Aug. 16, 1966.

The term "boneless comminuted meat," as used herein, denotes comminuted meat with substantially no entrained bone, cartilage, gristle, sinew or the like readily perceptible to the touch when held between the fingers. The team "dressed animal carcass," as used herein, denotes a conventional dressed whole carcass of a meat animal, such as beef, pork, or lamb; a conventional dressed whole carcass of poultry, such as chicken or turkey; and a gutted but otherwise whole carcass of fish, including scales and fins. The term "portion," as applied herein to a dressed animal carcass, denotes any part thereof, such as a prime cut of beef or pork, also referred to as "red meat"; a neck, wing, or back of chicken or turkey; or a headed and gutted fish from which the filets have been removed.

One object of the present invention is to provide a machine for the continuous production of boneless comminuted meat from a coarse agglomeration of meat and fragments of hard tissue material by removing those fragments perceptible to the touch, said machine having an improved separation unit enabling the machine to produce at a substantially greater rate than machines of the type heretofore known.

Another object of the invention is to provide a machine of the character set forth wherein the improved separator unit enables the machine to maintain its productivity for a substantially longer period of time than machines of the type heretofore known.

Still another object is to provide a machine of the nature set forth above and of simple, rugged construction adapted for easy disassembly and cleaning, complying in all respects with the high sanitation standards applicable to such machines.

Other objects and advantages will become apparent as the following description proceeds, taken together with the accompanying drawings, in which:

FIG. 1 is a side elevational view of an illustrative comminuted meat producing machine exemplifying the present invention.

FIGS. 2 and 3 are enlarged fragmentary sectional views taken transversely through the separator unit of the machine in the planes of the lines 2—2 and 3—3, respectively.

FIG. 4 is a further enlarged fragmentary sectional view taken longitudinally of the revolvable member in the machine of FIG. 1.

FIG. 5 is an enlarged fragmentary sectional view taken through a portion of the revolvable member in the plane of the line 5—5 in FIG. 4.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the invention is to cover all modifications, alternative constructions, and equivalents falling within the spirit and scope of the invention as expressed in the appended claims.

Referring more specifically to FIG. 1, the present invention is there exemplified in an illustrative machine 20 generally similar in organization to the machine disclosed in my prior Pat. No. 3,266,542, supra. The machine 20 comprises a base assembly 21 which supports a drive motor 22 and controller 24, a reduction gear 25, and a separator unit 26. The base assembly 21 in this case is provided with feet 28, 29 adapted for mounting on an appropriate support with the separator unit extending in overhanging relation therefrom.

The separator unit 26, like that disclosed in my aforesaid patent, comprises a generally cylindrical casing 30 which houses a power driven revolvable member 31 and a cooperating pressure bar 32. The member 31 is fashioned as a hollow cylindrical rotor with a plurality of relatively thin, helical cutting elements 34 disposed in closely spaced relation on its outer peripheral surface. The spaces between the cutting elements 34 communicate with the interior of the member 31 and have a width on the order of 0.008 inch which is somewhat smaller than the average diameter of the smallest fragments to be removed. The pressure bar 32 is mounted longitudinally of the revolvable member 31 and has an adjacent edge 35 tapering progressively closer to the member 31 in the direction of movement of the latter. The bar 32 is set at a clearance distance with respect to the member 31 which may be on the order of 0.007–0.010 inch.

The revolvable member 31 has a plurality of longitudinal slots 36 in its interior wall extending to the root diameter of the cutting elements 34 and connecting with the grooves therebetween (FIG. 2). The slots 36 define a corresponding series of longitudinal lands 38 in the wall and which are integral with the cutting elements 34 for structural rigidity. The member 31 has an end plate 39 fixed to its inboard end and another end plate 40 fixed to its outboard end. The end plate 40 is journaled in any suitable manner on the outboard end wall of the casing 30. The end plate 39 is formed with a drive sleeve 41, the latter being connected to the motor 22 and reduction gear 25 via detachable coupling 42 (FIGS. 1 and 2). The end plate 39 is formed with meat discharge apertures 44.

Boneless meat is removed from the member 31 and forced through the apertures 44 by means such as a fixed auger 45 having an auger shaft 46 which engages a fixed bracket 48 at the outboard end of the separator unit (FIG. 1), passing through the center of the otherwise solid end plate 40.

The casing 30 is formed with a relatively long intake aperture 49 in its upper portion surrounded by an intake hopper 50 (FIGS. 1 and 2). The hopper 50 and intake aperture 49 are adapted to receive a coarse agglomeration of meat and fragments of hard tissue from a grinder (not shown) and to pass such agglomeration into the work zone of the separator unit. In the work zone, the fragments are separated from the meat and the latter becomes further comminuted. The comminuted meat, free of such fragments, then passes out of the separator unit via a discharge aperture 51 and onto a collecting device such as conveyor MC. The fragments are expelled from the machine via an opening at the outboard end of the casing 30 and pass to a collecting device such as conveyor FC.

Provision is made in the machine 20 for substantially increasing its rate of production, and for maintaining its productivity for a substantially greater period of time, than has been attainable in such machines as heretofore known. This is accomplished by means of a modified configuration of the helical cutting elements 34. Referring more specifically to FIGS. 4 and 5, it will be noted that the outer peripheral portion of each cutting element 34 has a pair of ribs 52, 54 defined therein. The ribs 52, 54 are separated by a blind groove 55 and diverge from each other in cross-section. One of the ribs, in this instance the rib 52, is radially longer in cross-section than the rib 54 by an amount which may be on the order of 0.015 inch measured radially. Also, in this instance, the rib 54 is inclined away from the mating rib 52 of its pair and toward the rib 52 of the adjacent cutting element convolution 34. This inclination of the rib 52 defines a constricted throat $t$ in the open groove 56 between adjacent cutting element convolutions. The throat $t$, which may be on the order of 0.008 inch in width, is located adjacent the pressure face at the outer peripheral surface of the ribs. In addition, the throat $t$ is situated at the apex of a pocket defined by the outer peripheral face 58 of the rib 54 and that portion 59 of the side face of adjacent rib 52 projecting radially beyond the peripheral face 58. This pocket configuration, together with the radially and axially spaced cutting edges on the rib elements, enhances the cutting and feeding of fragment-free meat into the passages 56 as the member 31 moves past the pressure bar 32.

Moreover, the uneven configuration of the ribs is, in effect, a built-in corrugation in the outer peripheral surface of the revolvable member 31 which maintains its shape notwithstanding prolonged operation of the machine at full capacity. This tends to maintain productivity.

For the purpose of adjusting the rate at which material is fed into the work zone of the separator unit 26, a resilient regulator plate 60 is mounted above the pressure bar 32. The plate 60 in this case extends from the top of the bar 32 along one side of the arcuate pocket and partially up the adjacent wall of the hopper 50. The plate 60 may be adjusted for clearance with the member 31 by means of a series of screws 61, and for angular orientation by means of a series of screws 62 and back-up plate 64. The screws 62 engage tapped holes in the wall of the casing 30, while the screws 61 engage tapped holes in a bracket 65 extending from the casing. The bracket 65 also carries a series of adjusting screws 66 for the pressure bar 32. After adjustment, the bar 32 and plate 60 are secured in place by locking screws 68.

I claim as my invention:

1. A machine for removing fragments of hard tissue material such as bone, gristle or the like perceptible to the touch from comminuted meat and comprising, in combination;

(a) a machine casing;

(b) a hollow revolvable member mounted in said casing;

(c) a plurality of helical cutting elements in said revolvable member defining a plurality of constricted helical grooves therebetween communicating between the exterior and the interior of said revolvable member;

(d) means defining a pair of closely spaced ribs in the outer peripheral portion of each said cutting element, said ribs being separated by a blind groove and diverging from each other in cross-section;

(e) one of said ribs being radially longer in cross-section than the other rib;

(f) power means for revolving said revolvable member;

(g) a pressure bar extending axially of said revolvable member and spaced from said radially longer ribs by an amount not substantially greater than the smallest width of said constricted helical grooves;

(g1) said pressure bar being adapted to force meat without fragments into the interior of said revolvable member as the latter revolves;

(h) and means for removing meat without fragments from the interior of said revolvable member as the latter revolves.

2. A machine for the continuous production of boneless comminuted meat from a dressed animal carcass or any portion thereof which has been reduced to a coarse agglomeration of meat and fragments of hard tissue material such as bone, gristle or the like, said machine comprising, in combination;

(a) a casing;

(b) a hollow revolvable member mounted in said casing;

(c) a plurality of helical cutting elements on said revolvable member defining a plurality of helical grooves therebetween communicating between the exterior and the interior of said revolvable member;

(d) means defining a pair of closely spaced ribs in the outer peripheral portion of each said cutting element, said ribs being separated by a blind groove;

(e) one of said ribs being radially longer in cross section than the other rib;

(e1) said other rib being inclined away from said longer rib of its pair and toward the longer rib of the adjacent cutting element defining therewith a constricted throat in the groove therebetween;

(f) power means for revolving said revolvable member;

(g) a pressure bar extending axially of said revolvable member and spaced from said radially longer ribs by an amount not substantially greater than the constricted throat width of said helical grooves, said pressure bar and said revolvable member defining a work zone therebetween;

(h) means for feeding said coarse agglomeration into said work zone;

(i) said pressure bar being disposed to force meat without fragments into the interior of said revolvable member via said helical grooves as the latter revolves;

(j) said revolvable member being adapted to guide said fragments along said pressure bar to a collecting means;

(k) and means for removing meat without fragments from the interior of said revolvable member as the latter revolves and presenting said meat to another collecting means.

3. A machine as set forth in claim 1, wherein the radially longer rib is situated in leading relation to the shorter rib of its pair as said revolvable member is revolved.

4. A machine as set forth in claim 1, wherein the outer peripheral face of the radially shorter rib and that portion of the side face of the adjacent rib projecting radially beyond said outer peripheral face define a pocket with its apex forming the entrance to said constricted helical groove.

5. A machine as set forth in claim 2, wherein the radially longer rib is not inclined axially of said revolvable member.

6. A machine as set forth in claim 2, wherein the difference in radial length of said ribs is substantially 0.015 inch and the width of the constricted throat is substantially 0.008 inch.

References Cited

UNITED STATES PATENTS 3,266,542  8/1966  Paoli _____ 146—76
3,266,543  8/1966  Paoli _____ 146—76 X ANDREW R. JUHASZ, Primary Examiner Z. R. BILINSKY, Assistant Examiner U.S. Cl. X.R.

146—222